(12) United States Patent
Eichstaedt et al.

(10) Patent No.: US 6,385,619 B1
(45) Date of Patent: May 7, 2002

(54) AUTOMATIC USER INTEREST PROFILE GENERATION FROM STRUCTURED DOCUMENT ACCESS INFORMATION

(75) Inventors: Matthias Eichstaedt; Qi Lu, both of San Jose, CA (US); Shang-Hua Teng, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,117

(22) Filed: Jan. 8, 1999

(51) Int. Cl.[7] .............................................. G06F 17/30
(52) U.S. Cl. ............................ 707/104; 707/1; 707/2; 707/5; 707/6; 707/10; 707/106
(58) Field of Search ..................... 707/1, 5, 6, 9–10, 707/104, 2, 200

(56) References Cited

U.S. PATENT DOCUMENTS

| | | | | |
|---|---|---|---|---|
| 5,933,827 A | * | 8/1999 | Cole et al. ..................... | 707/10 |
| 5,943,670 A | * | 8/1999 | Prager ........................... | 707/5 |
| 6,029,195 A | * | 2/2000 | Herz .............................. | 709/219 |
| 6,038,560 A | * | 3/2000 | Wical ............................. | 707/5 |
| 6,038,561 A | * | 3/2000 | Snyder et al. .................. | 707/6 |
| 6,066,542 A | * | 5/2000 | Nielsen et al. .............. | 707/104 |
| 6,078,866 A | * | 6/2000 | Buck et al. .................... | 707/2 |
| 6,108,645 A | * | 8/2000 | Eichstaedt et al. ............. | 707/1 |
| 6,154,783 A | * | 11/2000 | Gilmour et al. ............... | 707/6 |
| 6,233,575 B1 | * | 5/2001 | Agrawal et al. ............... | 707/6 |

OTHER PUBLICATIONS

Applying evolutionary algorithms to the problem of information filtering—Tjoa, A.M., Sep. 1997.*

* cited by examiner

*Primary Examiner*—Hosain T. Alam
*Assistant Examiner*—Anh Ly
(74) *Attorney, Agent, or Firm*—Lumen Intellectual Property Services, Inc.

(57) ABSTRACT

A system generates user interest profiles by monitoring and analyzing a user's access to a variety of hierarchical levels within a set of structured documents, e.g., documents available at a web site. Each information document has parts associated with it and the documents are classified into categories using a known taxonomy. The user interest profiles are automatically generated based on the type of content viewed by the user. The type of content is determined by the text within the parts of the documents viewed and the classifications of the documents viewed. In addition, the profiles also are generated based on other factors including the frequency and currency of visits to documents having a given classification, and/or the hierarchical depth of the levels or parts of the documents viewed. User profiles include an interest category code and an interest score to indicate a level of interest in a particular category. The profiles are updated automatically to accurately reflect the current interests of an individual, as well as past interests. A time-dependent decay factor is applied to the past interests. The system presents to the user documents or references to documents that match the current profile.

8 Claims, 2 Drawing Sheets

AUTOMATIC USER INTEREST PROFILE GENERATION FROM STRUCTURED DOCUMENT ACCESS INFORMATION

FIELD OF THE INVENTION

The present invention relates generally to computer-implemented methods for generating user interest profiles for use in information content push systems and other information systems. In particular, the present invention relates to generating user interest profiles by monitoring and analyzing a user's access to a variety of hierarchical levels within structured documents.

BACKGROUND

Personalized information delivery becomes increasingly important as the Internet continues to grow at an exponential rate. Users are already overwhelmed with the amount of information available on the web and need support in screening out irrelevant documents. To address this need, there presently exist various webcasting or "push" services that deliver customized information to the user based on a personal profile. One of the main drawbacks in personalized information delivery or Webcasting systems today is that the user has to extensively interact with the delivery engine in order to customize his or her interest profile. Some customization schemes use Boolean search expressions while others employ relevance feedback from the user to derive the interest profile. This manual customization process is tedious and time consuming. Moreover, novice users have to learn how to interact with the delivery engine to get the desired results. The users also need to manually adjust their profiles every time they change their interests. There is a need, therefore, for a system and method that overcomes the above problems with current webcasting techniques.

SUMMARY

The present invention provides a profiling technique that generates user interest profiles by monitoring and analyzing a user's access to a variety of hierarchical levels within a set of structured documents, e.g., documents available at a web site. Each information document has parts associated with it and the documents are classified into categories using a known taxonomy. In other words, each document is hierarchically structured into parts, and the set of documents is classified as well. The user interest profiles are automatically generated based on the type of content viewed by the user. The type of content is determined by the text within the parts of the documents viewed and the classifications of the documents viewed. In addition, the profiles also are generated based on other factors including the frequency and currency of visits to documents having a given classification, and/or the hierarchical depth of the levels or parts of the documents viewed. User profiles include an interest category code and an interest score to indicate a level of interest in a particular category. Unlike static registration information, the profiles in this invention are constantly changing to more accurately reflect the current interests of an individual.

The key benefit this invention offers is that it automatically generates user profiles based on the type of content viewed, determined from classifications and categorizations of the content. A sampling scheme effectively presents carefully chosen documents with those documents that match the current profile in order to add new categories and delete old ones from the profile.

DETAILED DESCRIPTION

Although the present invention has many diverse applications and embodiments, for purposes of illustration, particular embodiments of the invention are described below in detail. It will be appreciated by those skilled in the art that many of these details may be altered in obvious ways without departing from the spirit and scope of the invention.

A preferred embodiment of the present invention automatically generates a profile that accurately captures a user's stable interest after monitoring the user's interaction with a set of structured documents. The technique of the present embodiment is based on the following three assumptions.

First, each document in the corpus has different levels, parts, or views. These views are used to determine the level of interest a user has in a particular document. A hierarchical document structure is a good example for a document with different views. Structured documents such as patents have a title, an abstract and a detailed description. These parts of the document may be categorized according to a 3-level hierarchy which then can be used to determine how interested a user is in a particular topic. For example, if a user only views the title of a patent document, the user probably has little or no interest in the content of the document. If the user views the abstract as well, the user can be assumed to have more interest in the content of the document. If the user goes on to view the detailed description, then there is good evidence that the user has a strong interest in the document, and the category into which it is classified. Generally, the more views, levels, or parts a document has, the finer will be the granularity of the present system. Although not all documents are structured at present, with the advent of XML, it is likely that the proportion of hierarchical documents available on the internet and in other databases will only increase.

Figure 1:
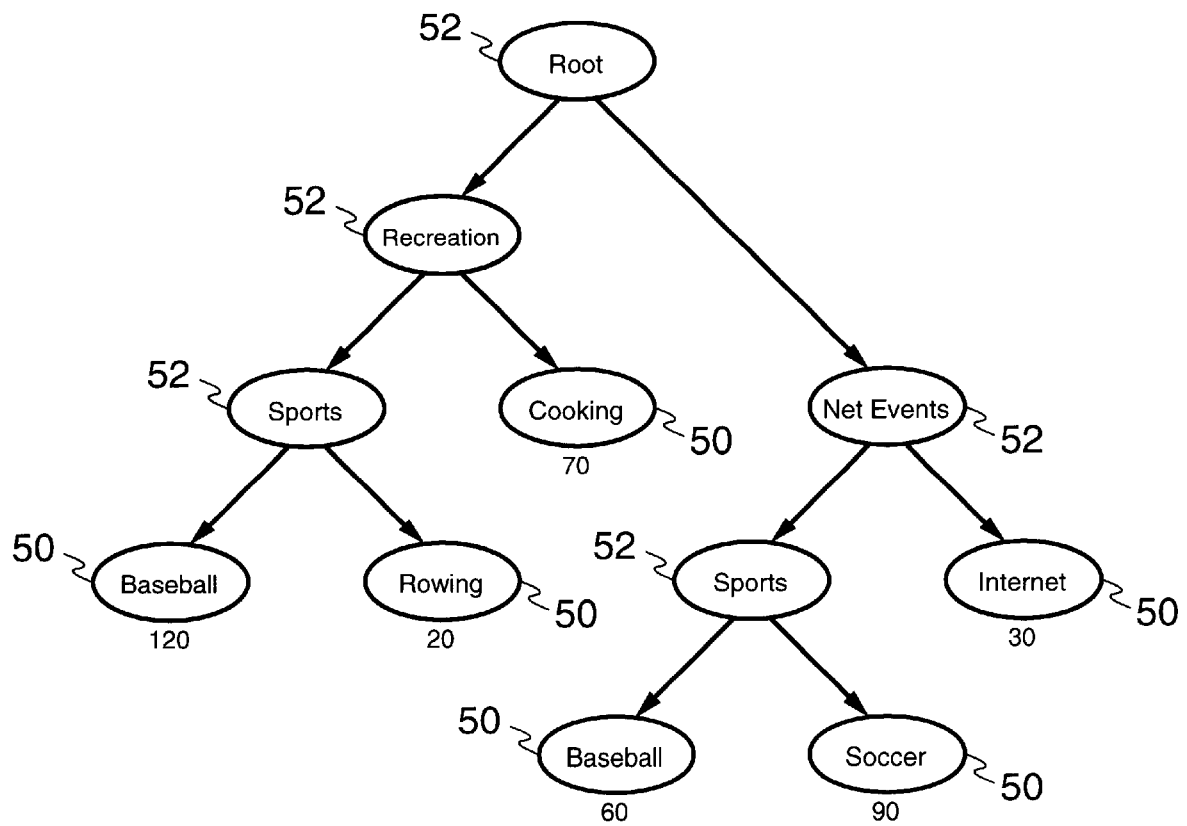
FIG. 1 illustrates a taxonomy tree with six leaf categories, according to a preferred embodiment of the present invention.

The second assumption is that the documents must already be assigned to at least one category of a known taxonomy tree for the database. Notice, however, that this system works with any existing taxonomy tree and does not require any changes to a legacy system. FIG. 1 illustrates a taxonomy tree with six leaf categories 50. Each leaf category has an interest value associated with it. Taxonomies are available for almost all domain-specific document repositories because they add significant value for the human user. For example, all U.S. patents are categorized into a classification tree which is defined by the U.S. Class Definitions. As another example, most Web search engines (such as Yahoo!, Excite, Lycos, Infoseek, etc.) provide a taxonomy that categorizes popular web pages. Although it is not necessary, for reasons of simplicity we assume that all documents are assigned to the leaf categories of a taxonomy tree. In cases where existing systems have documents assigned to an inner category 52, we can create a new child of the inner node and assign all document to the new child node. Then the new child node is a leaf node and we can apply the techniques of this embodiment. The assumption of an existing taxonomy does not diminish the wide applicability of this invention because almost all domain specific search engines offer high quality categorization.

The third assumption is that the system has the freedom to control the document flow to the user. In other words, the delivery engine can decide the intensity and the frequency with which documents will be sent to the user.

The above three assumptions do not preclude the present invention from being applicable for most commercial web sites such as www.amazon.com, www.yahoo.com and www.ibm.com/patent.

Figure 2:
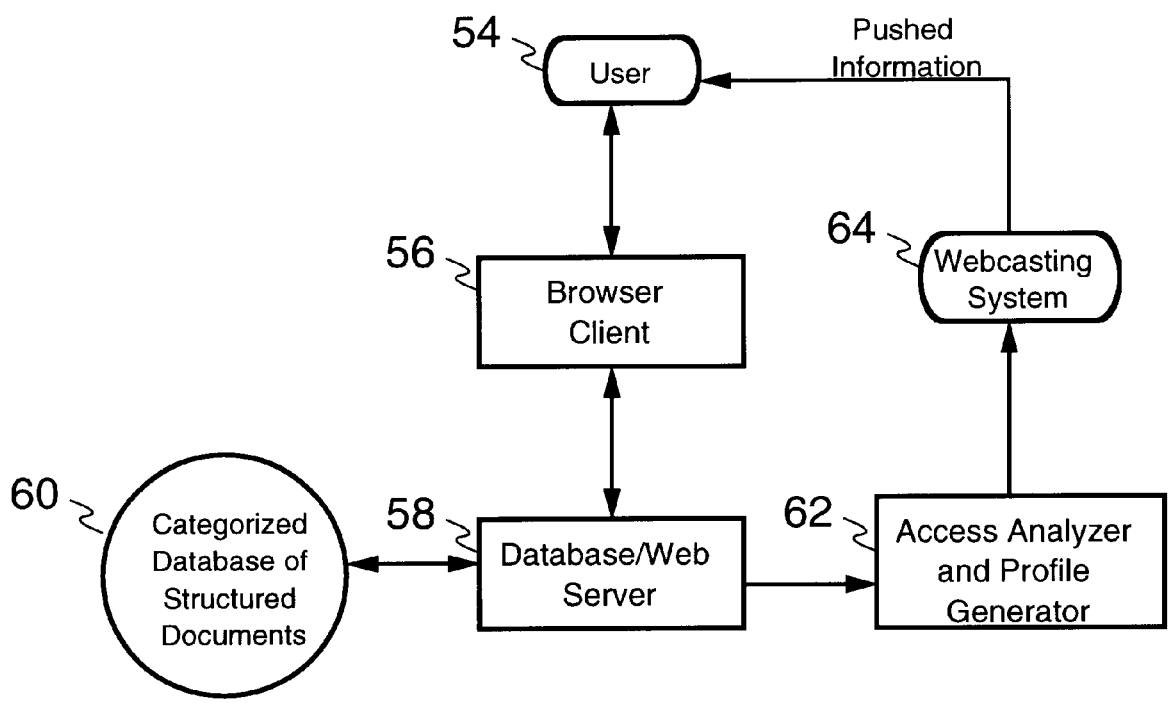
FIG. 2 illustrates the main components of a system for generating user interest profiles by monitoring and analyzing a user's access to i variety of hierarchical levels within structured documents according to a preferred embodiment of the invention.

FIG. 2 illustrates the main components of the system. A user 54, who is typically one of a large number of users, accesses a database or web server 58 via a browser client 56 or other database interface application program. In a conventional manner, the server responds to user clicks, selections, and other requests to view specific documents and parts of documents in a categorized database of structured documents 60. In the system of the present invention, a special access analyzer and profile generator 62 analyzes information about user access to database 60 to generate a profile for the user. The profile is then used by a webcasting system 64 to provide or "push" customized information back to the user 54. The database server 58, database 60, access analyzer and profile generator 62, and webcasting system 64 may be implemented on separate computer systems connected by a network, or may be functional components of a single computer system. Typically, the user 54 and client 56 is remote from the rest of the system, although it is not necessarily the case.

Ranking Categories

The profile generation algorithm in the present embodiment learns from positive feedback. Each view of a document signifies an interest level in the content of the document. This interest level is represented by a numerical value. As an example, reading a summary of a patent document is an automatic 'yes' vote for the title and reading the detailed description is an automatic 'yes' vote for the summary. For hierarchically structured documents we give more credit to a vote that occurred deeper in the document hierarchy than a vote at the top level element.

The present system represents the user interest as a disjunction of interest categories. The basic interest units are the categories that are defined by the taxonomy tree. In practice, most user profiles only contain a small number of categories. For example, FIG. 1 represents the following disjunction of categories in a user profile.

P = "Recreation|Sports|Baseball" v
"Recreation|Sports|Rowing" v "Recreation|Cooking" v
"NetEvents|Sports|Baseball" v
"NetEvents|Sports|Soccer" v "NetEvents|Internet"

Each basic interest unit (category) is associated with a weight that is a measure of the importance of the particular topic to the user. The larger the weight w of a category, the more interest was expressed by the user. The weight of a category is derived from the user's clicks on the various parts of a document. In the preferred embodiment of this invention, we use an interest function i(vs,cc,tc), which takes the following parameters as arguments.

1. vs (view score) is the score for the particular view that the user clicked on. For example, a headline, an abstract and a body of a document might have view scores of 1, 4 and 8, respectively.
2. cc (category clicks) is the number of clicks in one individual category.
3. tc (total clicks) is the total number of click of a user on the same day.

The important idea here is that the interest function reflects the user's interest in a document in relation to click activity in that particular group and on the entire site. The interest function may be defined as a weighted sum of these three parameters, or by various other mathematical combinations.

A scoring function s(w, r) then assigns a new weight to a category based on the previous weight w of that category and the result r=i(vs,cc,tc) of the interest function. We use a decay in the scoring function to express the fact that older votes become less important over time. One important property of the scoring is that it measures a stable interest over a long period of time. Variations in the current click behavior only marginally influence the new score of a category. Yet, long-term changes in the user's interest will be reflected in a significantly reduced score value. When a document belongs to more than one category, all covered categories will receive credit. Although many suitable scoring functions may be used with similar effect, one such function has the following form.

$$s(w, r) = we^{-\lambda} + r$$

where $\lambda$ is a decay factor which typically takes values between 0 and 1. Note that the scoring function can have a distinct $\lambda$ for various different categories. For example, a category dealing with the art of painting tends to have a smaller $\lambda$ than a category for classified adds because users typically have a long-term interest in arts. A threshold is used to filter out those articles that match categories with high weight. We call this threshold the drop-out threshold.

Subscribing to New Categories

The automatic profile generation system adjusts profiles to the user's changing interest by carefully injecting randomly selected documents into a dedicated category (e.g., a category called "What's new"). This "What's new" category is a channel where documents from all categories are delivered to probe the user's interest. Moreover, it is the carrier for controlled experiments to validate an anticipated interest. This mixed pushing method enables the user of a webcasting system to implicitly express current preferences.

When a sufficient number of clicks on documents from a particular category outside the scope of the current profile has occurred, the user may have changed his interest to include new categories not in his current profile. In order to validate this assumption and increase the system's confidence level, the webcasting system will intensify the stream of documents from that particular category over a certain period of time (one or two weeks). During this time the delivery engine will present documents from the category in question on a daily basis in the "What's new" category. If the number of clicks on documents from the newly added category is high compared to the total number of clicks during the period it is very likely that the user is interested that category. We use a predefined threshold to determine if the user is indeed interested in the new category. A user profile will be updated to the include the new category.

Depending on the nature of the new category the webcasting system may not have enough documents available to intensify the stream and validate the user's interest. In this case documents from the new category can be blocked until a sufficient amount has been accumulated. Alternatively, the system may reuse older articles to verify if the new category should be included in the user's profile.

The initial weight of a category when it is added to a profile is between the drop-out threshold and the highest weight among all categories for that user. Using the arithmetic mean of these two values prevents newly added categories from dropping out too quickly.

Unsubscribing from Categories

When a user has not clicked on documents from a certain category for a predetermined length of time (e.g., a week, or a month), the weight of the corresponding category will drop. This drop could be an indication for the fact that the user lost interest in that category and does not want to receive any similar documents. Another explanation of a dropping weight value is that the user is too busy to read enough documents from that particular category. A validation process is used here to verify if the user has a revived interest in the category. As described above, our system will intensify the stream of documents from the category in question for a certain period of time. Again, the special "What's new" category is used to perform this controlled experiment. When a sufficient click ratio has been reached after the validation period, the category will receive a weight value between the drop-out threshold and the currently highest weight. The category will be assigned a weight just below the drop-out threshold when the click ratio has not been sufficient.

When the webcasting system is initially started, the user will receive articles without any filtering in the "What's new" category. Clicking on documents will increase the weight of their categories and gradually build up the user's profile. As more and more categories reach the drop-out threshold, the system will enforce the filter. The initialization of the system is finished once a stable user profile has been reached.

As is evident from the above description, the present invention offers the following features and advantages.

1. The automatic profile generation algorithm is completely automated and derives the user profiles from implicit feedback. Therefore, the user community does not have to learn new rules to customize the pushed information stream.
2. The technique accurately measures the user's stable interest. The scoring scheme assumes that the documents have multiple views each of which reflects the level of interest. Furthermore, we assume that all documents have been classified using an existing taxonomy. This assumption does not limit the applicability of the present system because almost all domain-specific document repositories offer classification.
3. The system conducts controlled experiments to significantly raise the confidence level for in/ex-cluding certain categories into the subscription profile.
4. A scoring function computes a numerical value for the interest level in a particular category. Ad hoc changes in the user's click behavior have only limited impact on the score for a category while a persistent change of interest will decrease the score significantly.
5. The algorithm takes full advantage of existing classification information. The quality of manually maintained taxonomy tree is very high and this invention can take full advantage of this classification.
6. The system can take advantage of existing HTML and XML browsers and can be implemented with minimal extensions on the server side.

In addition to the preferred embodiment described in detail above, this invention can be used in many other contexts and applications as well. For example, it may be used as part of JCentral, IBM's search site for all Java related technology. Also, this technology can be used for the documents from IBM's patent server website. Industries (and companies) that would be likely make use of, and benefit from the invention are the Internet software industry, particularly those companies that specialize in information retrieval such as Oracle, Microsoft, Netscape, and Verity.

The invention has application to a variety of products, especially webcasting products. It can also be integrated into notification, alert and other information push products. The only prerequisites to integrate this invention into other webcasting systems are a document structure with multiple views, a taxonomy tree and the complete control over the document delivery schedule.

These and many other variations and applications of the present invention are considered within the spirit and scope of the invention, as defined by the following claims and their legal equivalents.

What is claimed is:

1. A computer-implemented method comprising:

receiving requests from a user to access a categorized database of structured documents, wherein the requests comprise selections of parts of the structured documents, wherein the parts are assigned hierarchical levels within the documents;

analyzing the received requests to determine database access information, wherein the access information comprises categories of accessed documents and interest scores of accessed documents, wherein the interest scores are selected in dependence upon the selections of parts of the structured documents requested by the user such that selections of parts having different hierarchical levels results in different interest scores;

generating from the database access information a user interest profile for the user, the user interest profile comprising a disjunction of a set of interest categories selected from a taxonomy tree and a set of weights corresponding to the interest categories; and selecting customized information relevant to the user interest profile and s communicating the selection to the user.

2. The method of claim 1 wherein the interest scores are selected in dependence upon a number of clicks in individual categories.

3. The method of claim 1 wherein the interest scores are selected in dependence upon a total number of clicks of a user in a day.

4. The method of claim 1 wherein the interest scores are selected by combining prior interest scores with current interest scores.

5. The method of claim 4 wherein the prior interest scores are reduced in value in accordance with a time-dependent decay factor.

6. The method of claim 1 wherein the database is categorized by a taxonomy tree such that each document is assigned to a leaf category of the tree.

7. The method of claim 1 wherein the weights measure the importance of the interest categories to the user.

8. A computer-implemented method comprising:

receiving requests from a user to access a categorized database of structured documents, wherein the requests comprise selections of parts of the structured documents, wherein the parts are assigned hierarchical levels within the documents and that selections of parts having different hierarchical levels results in different interest scores;

analyzing the received requests to determine database access information, wherein the access information comprises categories of accessed documents and interest scores of accessed documents, wherein the interest scores are selected by combining prior interest scores with current interest scores, wherein the current interest scores are calculated in dependence upon the selections of parts of the structured documents requested by the user, and wherein the prior interest scores are reduced in value in accordance with a time-dependent decay factor;

generating from the database access information a user interest profile for the user, wherein the user interest profile comprises a disjunction of a set of interest categories selected from a taxonomy tree and a set of weights corresponding to the interest categories; and selecting customized information relevant to the user interest profile and communicating the selection to the user.

* * * * *